United States Patent
Brady

(10) Patent No.: US 7,150,918 B2
(45) Date of Patent: Dec. 19, 2006

(54) BILAYER COATING SYSTEM FOR AN ELECTRICALLY CONDUCTIVE ELEMENT IN A FUEL CELL

(75) Inventor: Brian K. Brady, North Chili, NY (US)

(73) Assignee: General Motors Corporation, Detroit, MI (US)

( * ) Notice: Subject to any disclaimer, the term of this patent is extended or adjusted under 35 U.S.C. 154(b) by 151 days.

(21) Appl. No.: 10/788,804

(22) Filed: Feb. 27, 2004

(65) Prior Publication Data

US 2005/0191504 A1    Sep. 1, 2005

(51) Int. Cl.
- B05D 1/38 (2006.01)
- B05E 5/12 (2006.01)
- B32B 15/04 (2006.01)
- B32B 15/05 (2006.01)
- H01M 4/86 (2006.01)

(52) U.S. Cl. ............... 428/457; 428/651; 428/216; 428/336; 429/40; 429/210; 429/245; 429/247; 427/115; 427/126.1; 427/407.1; 427/419.5

(58) Field of Classification Search .......... 428/626, 428/457, 660, 650, 651, 649, 215, 216, 335, 428/336; 429/40, 44, 210, 245, 247; 427/115, 427/409, 126.1, 407.1, 419.5

See application file for complete search history.

(56) References Cited

U.S. PATENT DOCUMENTS

| | | | | |
|---|---|---|---|---|
| 5,578,388 | A | * | 11/1996 | Faita et al. .................. 429/30 |
| 5,593,797 | A | * | 1/1997 | Brecht ......................... 429/210 |
| 5,624,769 | A | | 4/1997 | Li et al. ....................... 429/32 |
| 6,372,376 | B1 | | 4/2002 | Fronk et al. ................. 429/41 |
| 2005/0037935 | A1 | * | 2/2005 | Elhamid et al. ............ 510/175 |

FOREIGN PATENT DOCUMENTS

EP    1 035 608 A2    9/2000

OTHER PUBLICATIONS

Hsu, J. et al., "Single-and dual-ion beam sputter deposition of titanium oxide films," Mar. 1, 1998, vol. 37, No. 7, Applied Optics, pp. 1171-1176.

Wood, W. G., "Metallic Coating Processes Other Than Plating," Metals Handbook, Ninth Ed., vol. 5, 29 Surface Technology, pp. 33-34 (1985), (no month).

"Cathode Enlargement,", Angstrom Sciences, Inc., http://www.angstromsciences,com/technology/cathode-enlargement.htm, downloaded Jul. 2, 2003, p. 1.

"Overview of Sputtering," Angstrom Sciences, Inc., http://www.angstromsciences.com/technology/sputtering.htm, downloaded Jul. 2, 2003, pp. 1-4.

"Sputtering Enlargement," Angstrom Sciences, Inc., http://www.angstromsciences.com/technology/sputtering-enlargement.htm, downloaded Jul. 2, 2003, p. 1.

(Continued)

Primary Examiner—Michael E. Lavilla
(74) Attorney, Agent, or Firm—Harness, Dickey & Pierce, P.L.C.

(57) ABSTRACT

The present invention relates to an electrically conductive element for an electrochemical cell comprising an electrically conductive corrosion-susceptible metal substrate having a surface susceptible to passivation by forming oxides in the presence of oxygen. The surface is treated to remove any oxides present, and then is overlaid with an electrically conductive corrosion-resistant coating comprising one or more elements from Groups 4, 5, 10, or 11 of the Periodic Table, and then a corrosion-resistant electrically conductive polymer-based coating. The underlying substrate thus has improved corrosion-resistance while maintaining electrical conductivity. Other preferred aspects of the present invention include methods of treating the electrically conductive contact element to resist corrosion while still maintaining electrical conductivity.

45 Claims, 7 Drawing Sheets

OTHER PUBLICATIONS

Edwards, J., "Coating and Surface Treatment Systems For Metals: A Comprehensive Guide to Selection", ASM International, pp. 390-399 (1997), (no month).

Ed. Davis., "ASM Specialty Handbook®: Aluminum and Aluminum Alloys", ASM International, pp. 455-457 (1993), (no month).

* cited by examiner

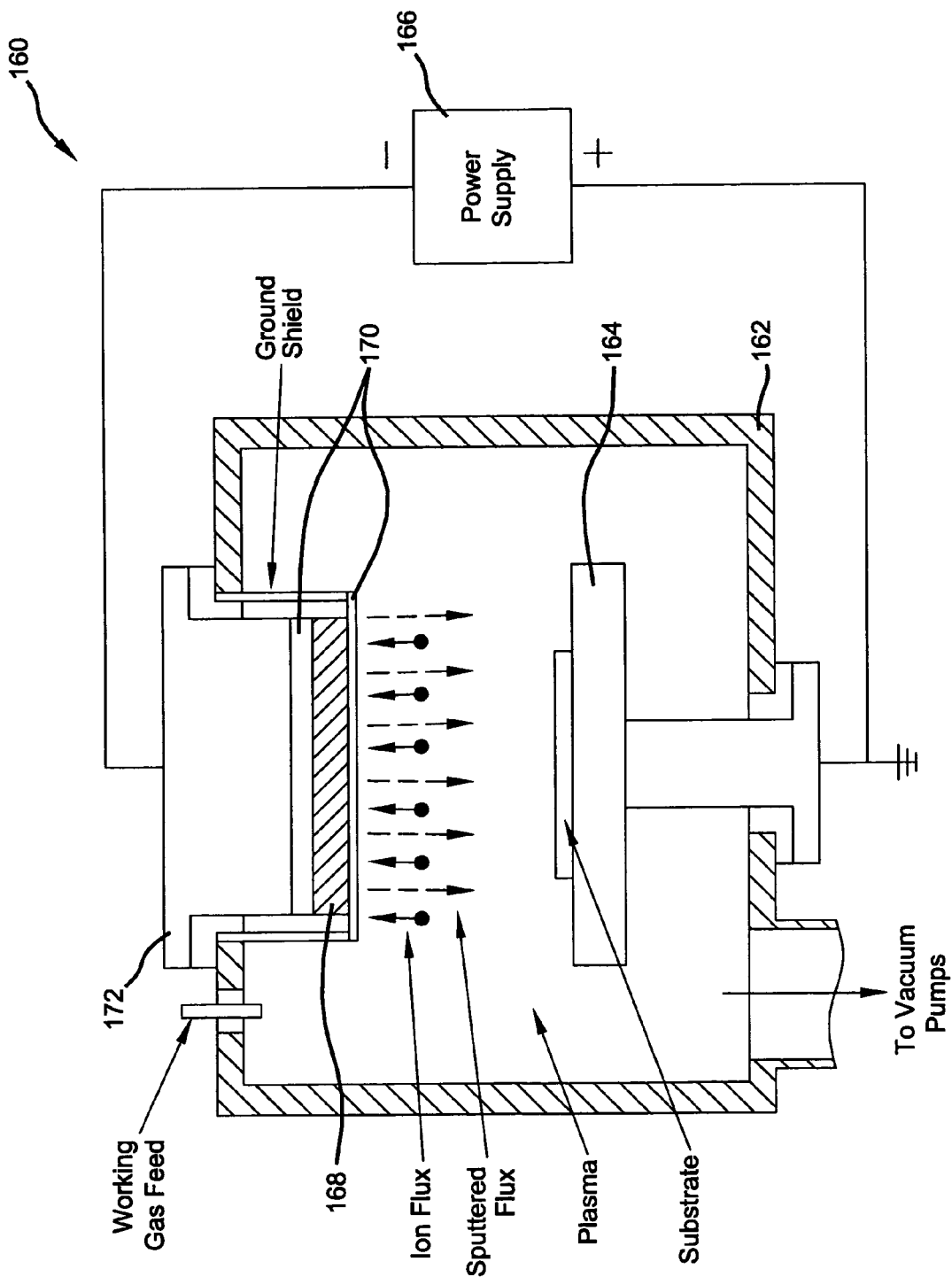

BILAYER COATING SYSTEM FOR AN ELECTRICALLY CONDUCTIVE ELEMENT IN A FUEL CELL

FIELD OF THE INVENTION

The present invention relates to PEM fuel cells and, more particularly, to corrosion-resistant electrically conductive elements and methods for making the same.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" comprising a thin, solid polymer membrane-electrolyte having an anode on one face of the membrane-electrolyte and a cathode on the opposite face of the membrane-electrolyte. The anode and cathode typically comprise finely divided carbon particles, very finely divided catalytic particles supported on the internal and external surfaces of the carbon particles, and proton conductive material intermingled with the catalytic and carbon particles.

The membrane-electrode-assembly is sandwiched between a pair of electrically conductive contact elements which serve as current collectors for the anode and cathode, and may contain appropriate channels and openings therein for distributing the fuel cell's gaseous reactants (i.e., $H_2$ & $O_2$/air) over the surfaces of the respective anode and cathode.

Bipolar PEM fuel cells comprise a plurality of the membrane-electrode-assemblies stacked together in electrical series while being separated one from the next by an impermeable, electrically conductive contact element known as a bipolar plate or septum. The septum or bipolar plate has two working faces, one confronting the anode of one cell and the other confronting the cathode on the next adjacent cell in the stack, and bipolar plate electrically conducts current between the adjacent cells. Contact elements at the ends of the stack contact only the end cells and are referred to as end plates.

In an $H_2$—$O_2$/air PEM fuel cell environment, the bipolar plates and other contact elements (e.g. end plates) are in constant contact with highly acidic solutions (pH 3–5) containing $F^-$, $SO_4^-$, $SO_3^-$, $HSO_4^-$, $CO_3^-$, and $HCO_3^-$, etc. Moreover, the cathode operates in a highly oxidizing environment, being polarized to a maximum of about +1 V (vs. the normal hydrogen electrode) while being exposed to pressurized air. Finally, the anode is constantly exposed to super atmospheric hydrogen. Hence, contact elements made from metal must be resistant to acids, oxidation, and hydrogen embrittlement in the fuel cell environment while maintaining good electrical conductivity. As few metals exist that meet this criteria, contact elements have often been fabricated from large pieces of graphite, which is corrosion-resistant, and electrically conductive in the PEM fuel cell environment. However, graphite is quite fragile, and quite porous making it extremely difficult to make thin gas impervious plates therefrom.

Lightweight metals, such as aluminum and its alloys, have also been proposed for use in making fuel cell contact elements. Such metals are more conductive than graphite, and can be formed into very thin plates, which increases the gravimetric efficiency of the fuel cell. Unfortunately, such light weight metals are susceptible to corrosion in the hostile PEM fuel cell environment, and contact elements made therefrom potentially dissolve (e.g., in the case of aluminum) in the fuel cell environment. Other desirable metals include stainless steel or titanium, which while more corrosion resistant, are susceptible to passivation, where metal oxides form at the surface. The metal oxides increase surface contact resistance, making them undesirable to use directly in a fuel cell current collector due to impermissibly high electrical resistance.

In light of the corrosion sensitivity of lightweight metals, such as aluminum, efforts have been made to develop protective coatings. However, some of these protective methods increase the electrical resistance of the aluminum plate to unacceptable levels. Other methods of protection keep the conductivity at an acceptable level, but do not sufficiently achieve the desired level of protection, or are cost prohibitive. Accordingly, there is a need for conductive bipolar plate which is corrosion resistant and electrically conductive to promote power output and efficiency of the fuel cell.

SUMMARY OF THE INVENTION

The present invention provides a method for treating an electrically conductive element in a fuel cell comprising: providing a conductive corrosion-susceptible metal substrate having a surface susceptible to passivation by forming oxides in the presence of oxygen; removing the oxides from the surface; and depositing an electrically conductive coating onto the surface. The coating comprises one or more elements selected from Groups 4, 5, 10, or 11 of the Periodic Table, the coating has a corrosion-resistance greater than the metal substrate and having a thickness of less than about 50 microns. An electrically conductive corrosion-resistant polymer-based coating is applied, overlaying the coating comprising the one or more elements on the surface.

The present invention also provides, an alternate preferred embodiments, a method for treating an electrically conductive element in a fuel cell comprising: providing a conductive corrosion-susceptible metal substrate having a surface susceptible to passivation by forming oxides in the presence of oxygen; treating the substrate to remove the oxides from the surface; depositing an electrically conductive titanium-based coating comprising titanium (Ti) onto the surface, wherein the treated and titanium-coated substrate has a greater corrosion-resistance and a greater electrical conductivity relative to an untreated and uncoated substrate; and applying an electrically conductive corrosion-resistant polymer-based coating overlaying the titanium-based coating on the surface.

Other aspects of the present invention provide an electrically conductive element for use in a fuel cell comprising an electrically conductive corrosion-susceptible metal substrate having a surface susceptible to passivation by forming oxides in the presence of oxygen, where the surface is substantially free of the oxides and overlaid with an electrically conductive corrosion-resistant coating comprising titanium and having a thickness of less than 50 microns. A corrosion-resistant electrically conductive polymer-based coating is applied over the titanium-based coating on the surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is an illustration of an alternate magnetron sputtering physical vapor deposition apparatus used to coat an electrically conductive element with an electrically conductive metal.

DETAILED DESCRIPTION OF THE PREFERRED EMBODIMENTS

The following description of the preferred embodiment(s) is merely exemplary in nature and is in no way intended to limit the invention, its application, or uses. The present invention relates to an electrically conductive element in a fuel cell (e.g. PEM fuel cell) comprising an electrically conductive corrosion-susceptible metal substrate having a surface susceptible to passivation in the presence of oxygen by forming oxides. By "corrosion-susceptible metal" it is meant that the metal is either oxidized/passivated or dissolved by the cell's environment. To protect the underlying substrate from attack by corrosive agents within the fuel cell, the surface is treated to be substantially free of any oxides, and overlaid with an electrically conductive corrosion-resistant metal coating. A corrosion-resistant electrically conductive polymer-based coating is applied over the metal coating of the surface, and the substrate is thus protected from corrosive attack while maintaining the necessary electrical conductivity to function within a fuel cell.

Figure 1:
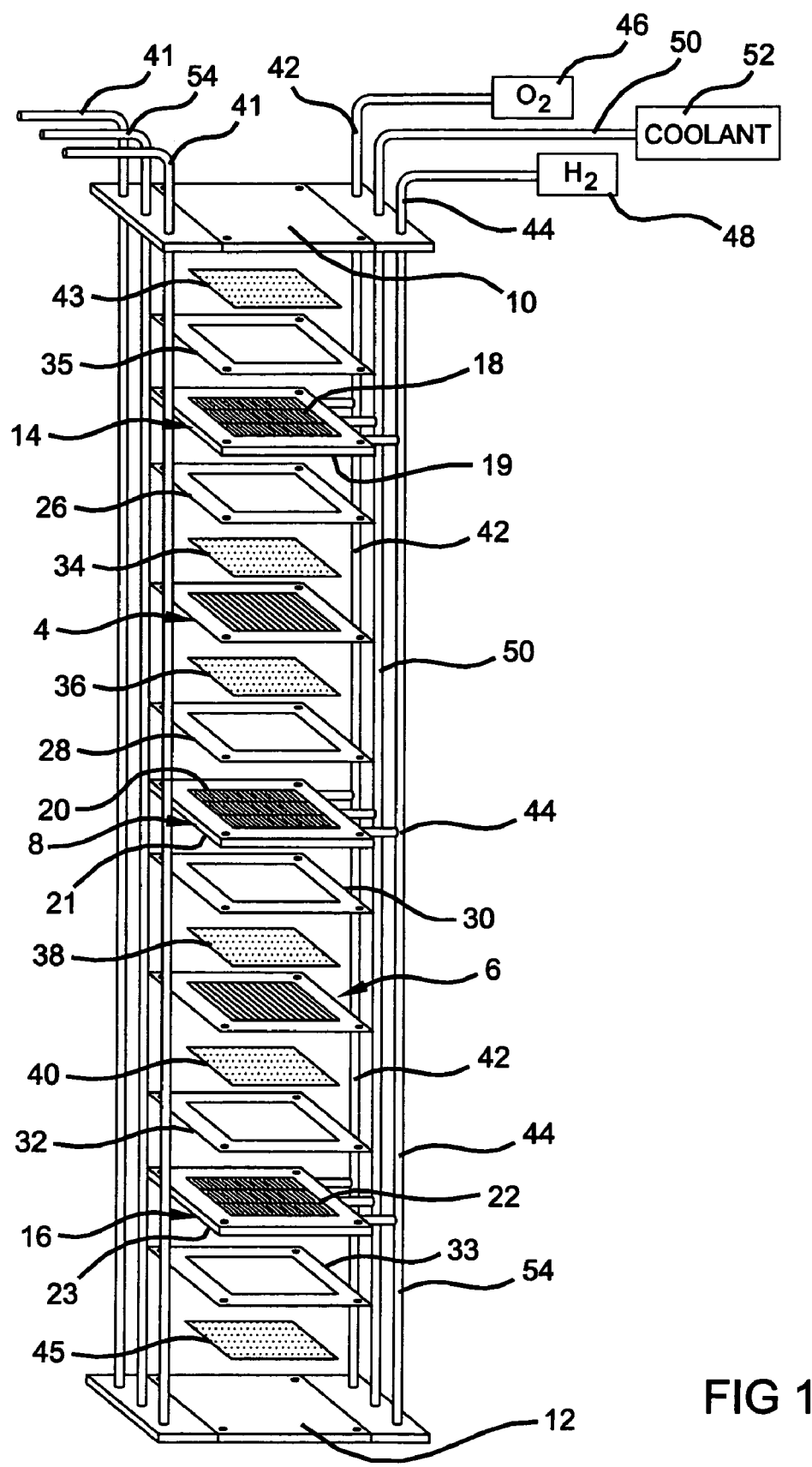
FIG. 1 is a schematic, exploded, isometric, illustration of a liquid-cooled PEM fuel cell stack (with only two cells shown)

To gain a better understanding of the present invention, an exemplary fuel cell where the present invention may be employed is shown in FIG. 1, which depicts two individual proton exchange membrane (PEM) fuel cells connected to form a stack having a pair of membrane-electrode-assemblies (MEAs) 4, 6 separated from each other by an electrically conductive, liquid-cooled, bipolar separator plate conductive element 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21 respectively facing a separate MEA 4, 6 with opposite charges that are separated, hence the so-called "bipolar" plate. As described herein, the fuel cell stack is described as having conductive bipolar plates, however the present invention is equally applicable to stacks having only a single fuel cell.

The MEAs 4,6 and bipolar plate 8 are stacked together between metal clamping terminal plates 10,12 and end contact fluid distribution elements 14,16. The end fluid distribution elements 14, 16, as well as both working faces or sides 20,21 of the bipolar plate 8, contain a plurality of lands adjacent to grooves or channels on the active faces 18, 19, 20, 21, 22, and 23 for distributing fuel and oxidant gases (i.e., $H_2$ and $O_2$) to the MEAs 4,6. Nonconductive gaskets or seals 26, 28, 30, 32, 33, and 35 provide seals and electrical insulation between the several components of the fuel cell stack. Gas-permeable conductive diffusion media 34, 36, 38, and 40 press up against the electrode faces of the MEAs 4,6. Additional layers of conductive media 43, 45 are placed between the end contact fluid distribution elements 14,16 and the terminal collector plates 10,12 to provide a conductive pathway therebetween when the stack is compressed during normal operating conditions. The end contact fluid distribution elements 14,16 press up against the diffusion media 34,43 and 40,45 respectively.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing 41 for both the $H_2$ and $O_2$/air sides of the MEAs is also provided. Additional plumbing 50 is provided for circulating coolant from a storage area 52 through the bipolar plate 8 and end plates 14, 16 and out the exit plumbing 54.

Figure 2:
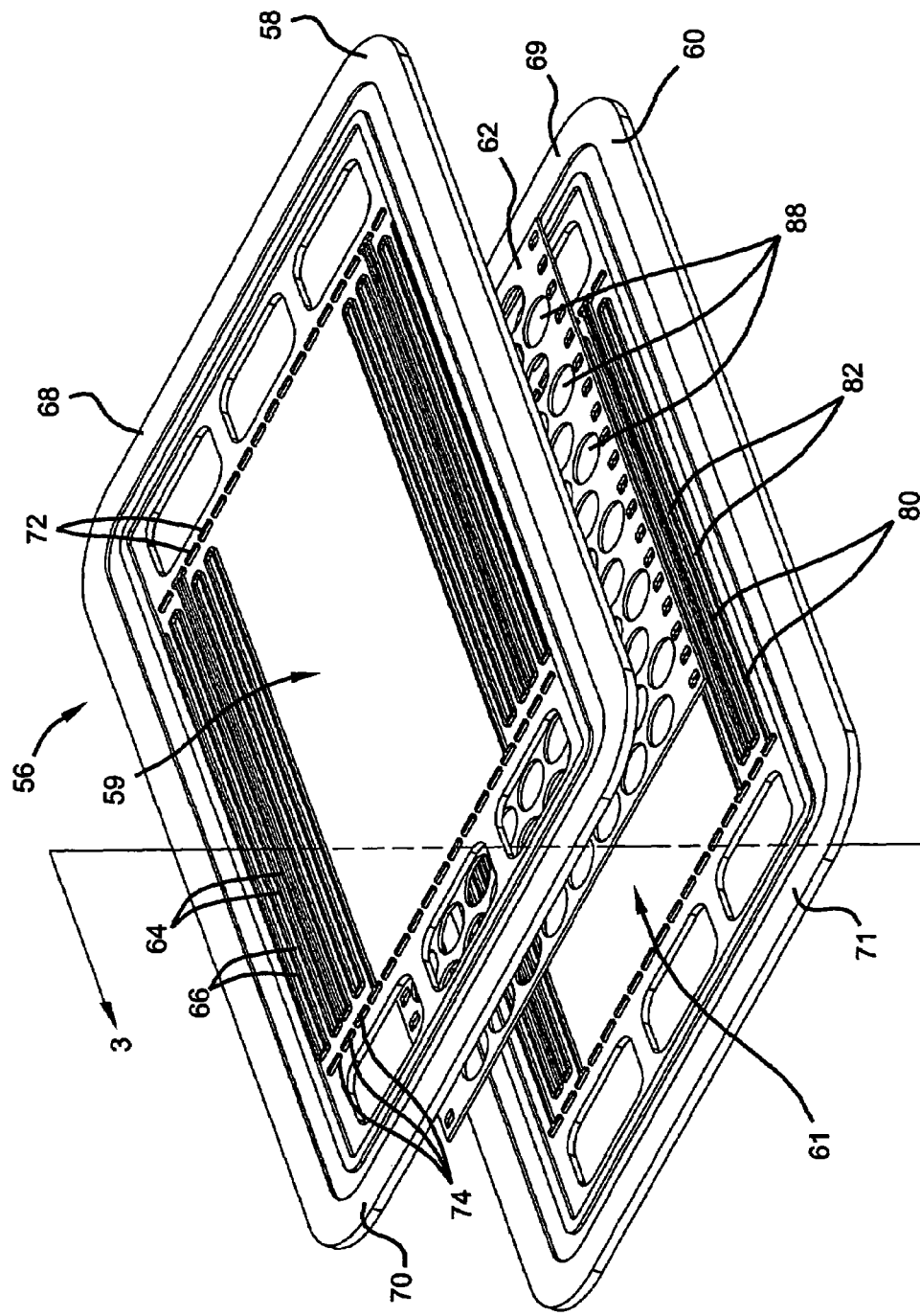
FIG. 2 is an exploded, isometric view of a bipolar plate useful with PEM fuel cell stacks like that illustrated in FIG. 1.

FIG. 2 is an isometric, exploded view of a bipolar plate 56 comprising a first exterior metal sheet 58, a second exterior metal sheet 60, and an interior spacer metal sheet 62 interjacent the first metal sheet 58 and the second metal sheet 60. The exterior metal sheets 58,60 are made as thin as possible (e.g., about 0.002–0.02 inches thick), which may be formed by stamping, by photo etching (i.e., through a photolithographic mask) or any other conventional process for shaping sheet metal. The external sheet 58 has a first working surface 59 on the outside thereof which confronts a membrane-electrode-assembly (not shown) and is formed so as to provide a plurality of lands 64 which define therebetween a plurality of grooves 66 known as a "flow field" through which the fuel cell's reactant gases (i.e., $H_2$ or $O_2$) flow in a tortuous path from one side 68 of the bipolar plate to the other side 70 thereof. When the fuel cell is fully assembled, the lands 64 press against the carbon/graphite papers (such as 36 or 38 in FIG. 1) which, in turn, press against the MEAs (such as 4 or 6 in FIG. 1, respectively). For drafting simplicity, FIG. 2 depicts only two arrays of lands 64 and grooves 66. In reality, the lands and grooves 64,66 will cover the entire external surfaces of the metal sheets 58, 60 that engage the carbon/graphite papers. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell.

Figure 3:
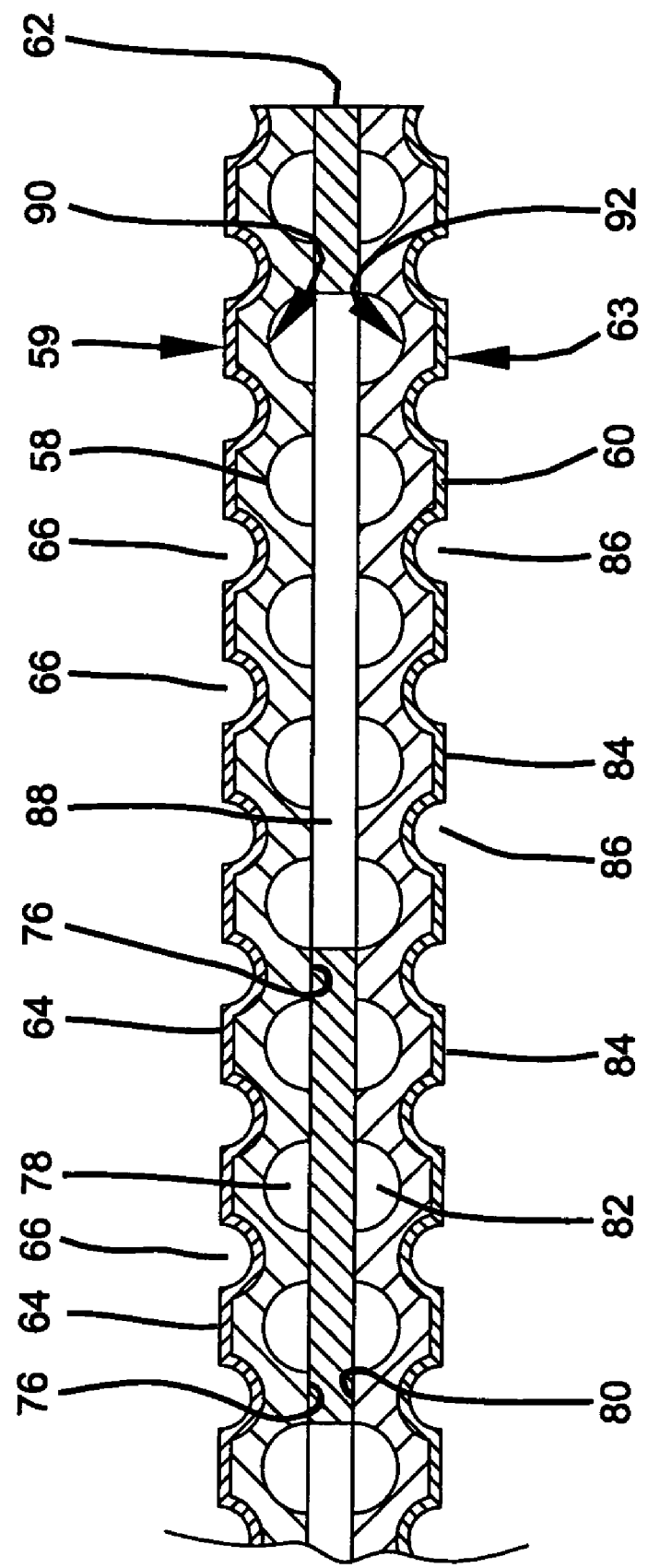
FIG. 3 is a partial cross-sectional view in the direction 3—3 of FIG. 2.

As best shown in FIG. 3, the underside of the sheet 58 includes a plurality of ridges 76 which define therebetween a plurality of channels 78 through which coolant passes during the operation of the fuel cell. A coolant channel 78 underlies each land 64 while a reactant gas groove 66 underlies each ridge 76. Alternatively, the sheet 58 could be flat and the flow field formed in a separate sheet of material. Metal sheet 60 is similar to sheet 58. The internal surface 61 (i.e., coolant side) of sheet 60 is shown in FIG. 2.

In this regard, there is depicted a plurality of ridges 80 defining therebetween a plurality of channels 82 through which coolant flows from one side 69 of the bipolar plate to the other 71. Like sheet 58 and as best shown in FIG. 3, the external side of the sheet 60 has a working surface 63 having a plurality of lands 84 thereon defining a plurality of grooves 86 through which the reactant gases pass. An interior metal spacer sheet 62 is positioned interjacent the exterior sheets 58,60 and includes a plurality of apertures 88 therein to permit coolant to flow between the channels 82 in sheet 60 and the channels 78 in the sheet 58 thereby breaking laminar boundary layers and affording turbulence which enhances heat exchange with inside surfaces 90, 92 of the exterior sheets 58, 60 respectively.

The spacer sheet 62 is positioned between the first sheet 58 and second sheet 60, where the ridges 76 on the first sheet 58 and the ridges 80 on the second sheet 60 are bonded (e.g. by a bonding layer 85, such as brazement or adhesives) to the spacer sheet 62. As recognized by one of skill in the art, the current collectors prepared in accordance with the present invention may vary in design from those described above, such as for example, in the configuration of flow fields, placement and number of fluid delivery manifolds, and the coolant circulation system, however, the function of conductance of electrical current through the surface and body of the current collector functions similarly between all designs.

Figure 4:
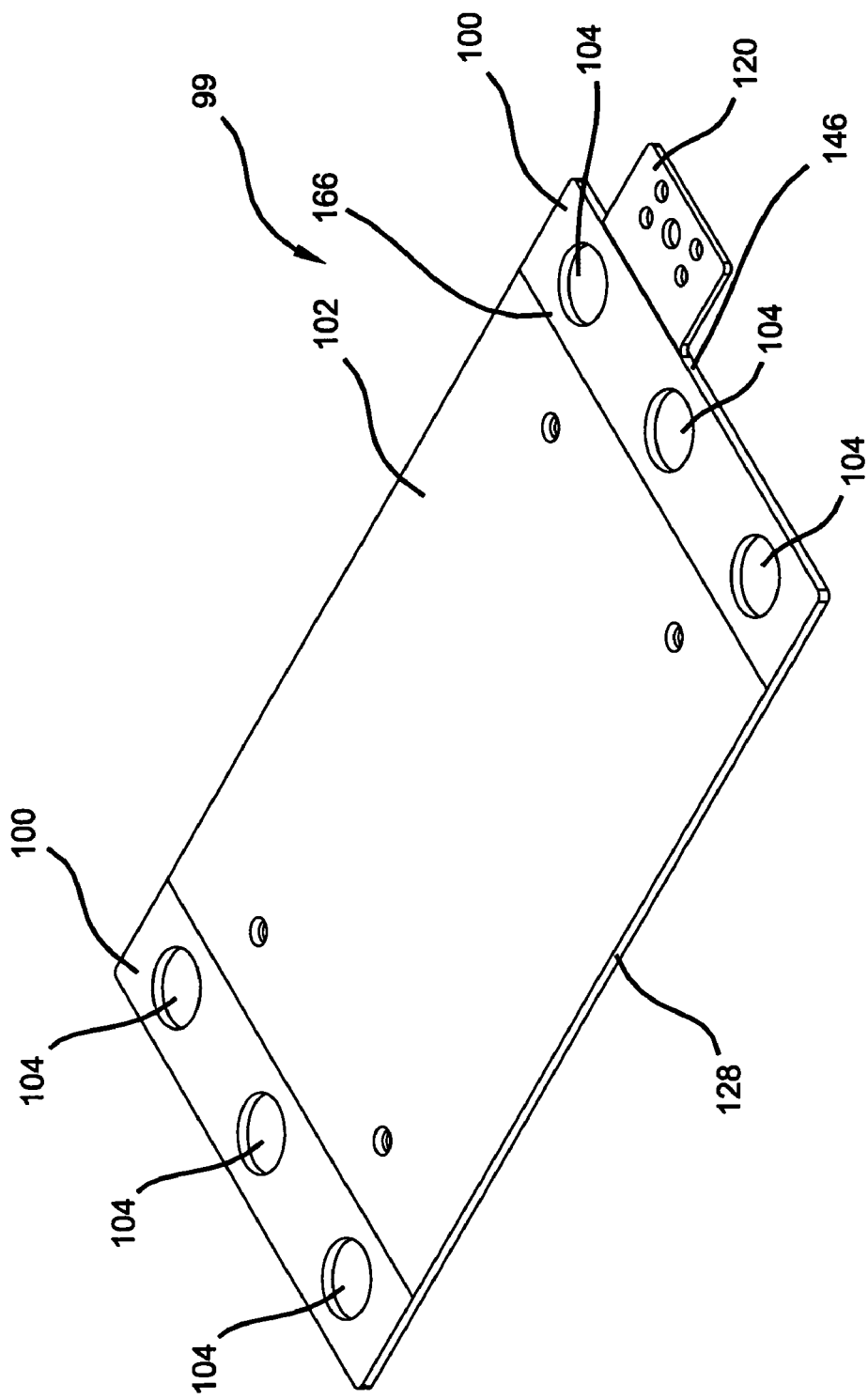
FIGS. 4 is a terminal collector end plate useful with PEM fuel cell stacks like that illustrated in FIG. 1.

The present invention is also applicable to other conductive elements in a fuel cell, such as terminal collector end plates like the exemplary one shown in FIG. 4. A terminal collector end plate 99 (such as 10 or 12 of FIG. 1) has an electrically non-conductive region 100, as well as an electrically conductive region 102. The conductive regions 102 of the terminal plate 99 are typically separated from the non-conductive region 100 by sealing gaskets 33,35 (FIG. 1). Apertures 104 within the non-conductive region 100 extend through the body, or substrate, 128 of the terminal plate 99 and permit fluid transport (e.g. $H_2$, $O_2$, coolant, anode and cathode effluent) both into and out of the stack during operating conditions. The particular quantity or sequence of the apertures 104 is not limiting, and is merely exemplary as described herein, as numerous configurations are possible as recognized by one of skill in the art. A bipolar plate flow field design may dictate the inlet and outlet aperture 104 configurations and fluid delivery placement. An electrically conductive collector tab 120 can be attached to external leads, facilitating the external collection of current from the stack.

Selection of the material of construction for an electrically conductive element within a fuel cell, such as bipolar plates or terminal plates, includes weighing such parameters as overall density (mass and volume), electrical contact resistance of the substrate measured at the surface, bulk conductivity, and corrosion and oxidation resistance. Thus, the important considerations for an electrical element include surface and bulk intrinsic conductivity of the material to perform as an electrical current collector, while withstanding the potentially corrosive conditions experienced within the fuel cell. It is preferred that electrically conductive current collectors according to the present invention comprise a conductive metal, and most preferably a lightweight metal, comprising aluminum, titanium, magnesium, and alloys thereof. Most preferred electrically conductive elements according to the present invention comprise aluminum.

Metal materials undergo a variety of chemical reactions that impact functionality within the fuel cell. Corrosion refers to the unintentional and destructive attack of a material, which generally occurs by an electrochemical dissolution. Thus, a corrosion-susceptible material, such as a metal, is subject to degradation within an operating fuel cell environment. Passivation, as used herein, generally refers to a conversion process where a surface of a metal is rendered less chemically reactive. Passivation generally falls within the process of corrosion, where the metal is attacked by a corrosive agent. However, after exposure to a corrosive agent (e.g. oxygen) for a certain time period, the passivation process will cease in certain metals, and the surface is left with a protective passivation film that renders the surface of the plate more electrochemically inert than its pre-treated state. Such a passivation layer appears to protect the underlying metal by making it less prone to corrosion when compared with the pre-treated metal surface, such as is the case with stainless steel alloys and titanium. Other lighter metals, including for example, magnesium and aluminum, also react with oxygen to form metal oxides, however, the natural oxide formation (passivation) fails to form a protective layer against corrosive agents within the fuel cell. Thus, these metals still remain susceptible to corrosive acid attack, where the underlying metal is dissolved away.

Although metal surfaces are often intentionally processed to form the passivation layer, mere exposure to oxygen also passivates certain metallic surfaces. While having corrosion resistance benefits, passivated surfaces in conductive metals also exhibit high electrical contact resistance values. Generally, such metals having passivated surfaces are poor electrical conductors. Activation, in contrast to passivation, is the conversion process of making a surface relatively more active. Thus, activation often entails removing the passivation layer from a surface, by subjecting the surface to reducing conditions, which renders it more electrochemically active and hence reduces electrical contact resistance.

Thin lightweight metal elements (e.g. aluminum, magnesium, and titanium) can be used to decrease the volumetric and gravimetric power density of the fuel cell stack. Further, lightweight metals have relatively high strength, physical durability, adherence to protective coatings, and are less expensive than many other conductive metal alternatives. However, the oxide layer at the surface impermissibly increases electrical contact resistance of the substrate, and further such metals are highly susceptible to corrosive attack. In light of such corrosion sensitivity and similar propensity for oxidation, various protective coatings are used for the metal substrate. Often such protective coatings increase the electrical resistance of the metal plate to unacceptable levels, fail to adequately protect the underlying substrate, or are very costly, such as with gold or platinum coatings. Thus, there is a trade-off between conductivity and corrosion protection. It is an object of the present invention to reduce the overall electrical contact resistance of an electrically conductive element, while providing cost-effective corrosion and oxidation resistance for the underlying metal substrate of the conductive element.

According to one aspect of the present invention, an electrically conductive element or current collector made of a corrosion-susceptible metal is treated to impart a low contact resistance and further overlaid with electrically conductive protective coatings to withstand corrosion and oxidative attack, while minimizing the amount of substrate metal lost during the activation process. Such a treatment permits the use of metals, such as aluminum and magnesium, which previously had too high of a corrosion susceptibility or an electrical contact resistance for practical use in a fuel cell.

Figure 5:
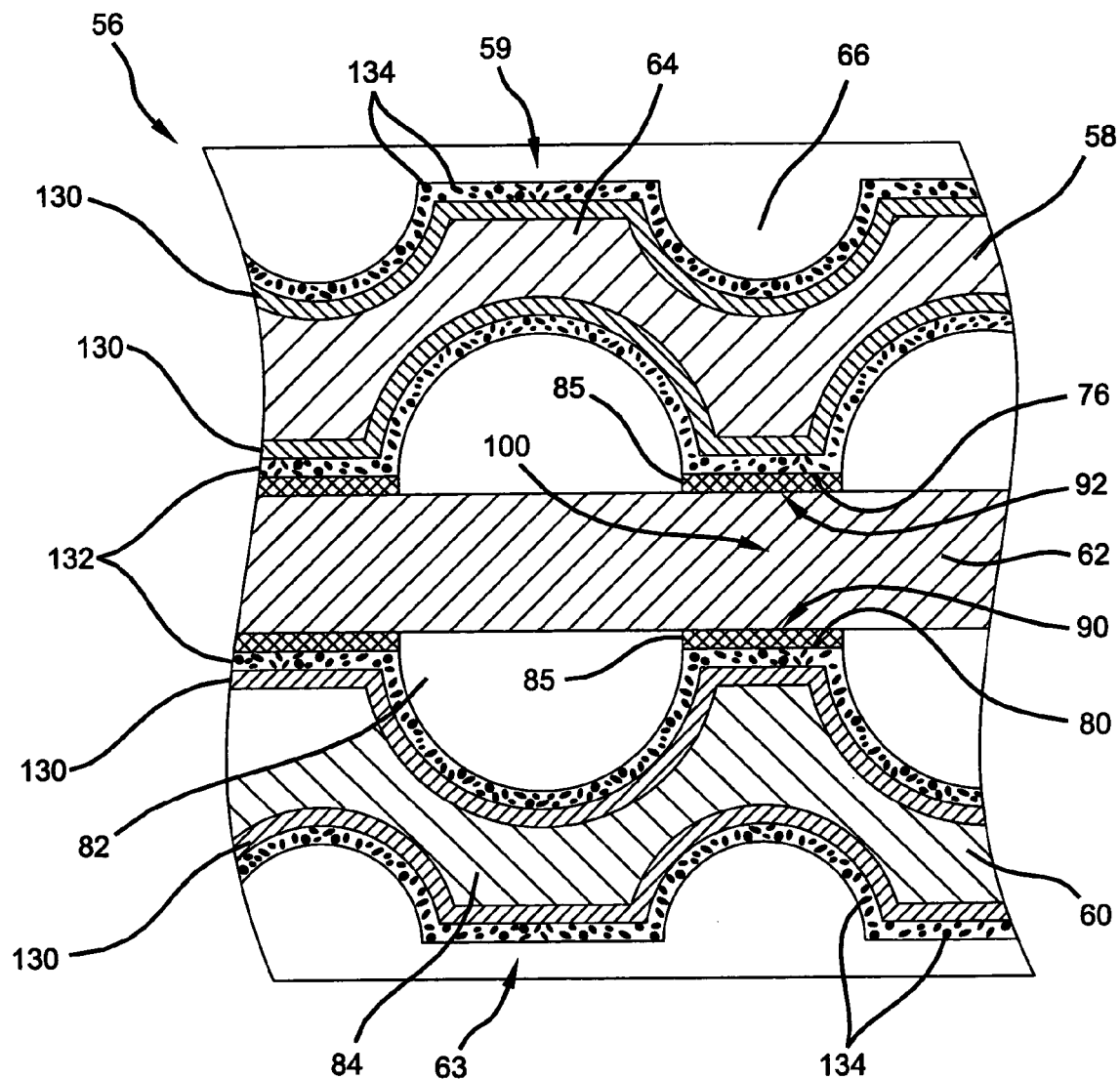
FIG. 5 is a magnified portion of the bipolar plate of FIG. 3.

In accordance with a preferred embodiment of the present invention as shown in FIG. 5, the electrically conductive element (e.g. bipolar plate 56) is formed of a substrate metal (such as sheets 58 or 60) which comprises a corrosion-susceptible metal such as aluminum. The substrate surfaces 59,63 of the first and second sheets 58,60 which are exposed to a hostile or corrosive environment in the fuel cell are first overlaid with a thin electrically conductive protective metal coating 130. Further, an electrically conductive corrosion-resistant protective polymer-based coating 132 overlays the thin metal coating 130 along both the first surface 59 of the first sheet 58 and the second surface 63 of the second sheet 60. Corrosion-resistant refers to a material's reduced susceptibility to corrosion including chemical attack mechanisms such as: oxidation (i.e. inadvertent electrochemical reaction), acid attack, or both. "Relatively" corrosion resistant refers to a material's ability to better resist corrosion when compared with other similar materials, resulting in a lower corrosion rates and a longer lifespan. The interior surfaces 90, 92 may be coated with the same protective coatings (130, 132), different protective coatings (not shown), or with no coatings at all (not shown). Such a determination depends upon the chemistry of the coolant and the relative corrosion resistance needed. Thus, in certain preferred embodiments, as shown in FIG. 5, the thin metal coating 130 and the corrosion-resistant polymer-based coating 132 may optionally be applied to the interior first surface 90 of the first sheet 58 and second surface 92 of the second sheet 60, to protect the substrate from corrosive oxidative attack by the coolant. The protective metal coating 130 and polymer-based coating 132 are a practical way to isolate the electrically conductive element from corrosive agents that are prevalent both in the processing environment and in the fuel cell itself, while still maintaining electrical conductivity.

Preferred aspects of the protective metal coating layer 130 of the present invention include enhancing electrical conductivity and corrosion-resistance, while reducing cost by applying minimal quantities of the metal in a thin layer. Further, the metal coating 130 facilitates better adhesion of subsequent applications of polymer-based coatings 132. This minimizes potential flaws in the coating, such as pinholes which expose areas of uncoated metal. These pinholes arise as small, unprotected regions of the metallic surface, and have the potential to become growth sites for corrosion, especially where the surface energy of respective layers are similar. Such sites may further expand at the surface, thus, the coating 130 on the surface minimizes the occurrence of such defects, by providing a layer with a different surface energy and increasing adhesion of any subsequently applied layers 132.

Preferred thin electrically conductive, corrosion-resistant metal coatings 130 according to the present invention comprise one or more elements selected from the Groups 4, 5, 10, or 11 of the IUPAC Periodic Table. Certain preferred embodiments for coatings of the present invention comprise: titanium (Ti), Zirconium (Zr), Vanadium (V), Niobium (Nb), Tantalum (Ta), Gold (Au), Platinum (Pt), and mixtures and alloys thereof. Further, such coatings may comprise compounds and alloys of elements selected from Groups 4, 5, 10, and 11, where such compounds form electrically conductive corrosion resistant coatings, such as certain metal nitride, boride, and oxide compounds. Particularly preferred corrosion resistant coatings comprise one or more elements selected from Groups 4 or 5 of the Periodic Table.

In one particularly preferred embodiment of the present invention, the coating comprises titanium or is titanium-based (Ti-based). Thus, certain preferred coating compounds comprise titanium (Ti) or titanium nitride (TiN). Particularly preferred coatings 130 according to the present invention comprise suboxides of titanium, generally represented by the nominal general formula $TiO_x$, where $0<x<2$. In titanium suboxide, the electrons are delocalized in the bulk of the coating and occupy a conduction band, which permits increased electrical conductivity. The formation of the titanium suboxides in preferred embodiments of the present invention is discussed in greater detail below, and facilitates an increased electrical conductivity for the conductive element. Further, titanium suboxides generally have improved corrosion-resistance over pure titanium or titanium nitride. Thus, a titanium suboxide coating 130 could be used over a titanium substrate to improve corrosion resistance and electrical conductivity in accordance with the present invention.

The present invention also contemplates multiple coating 130 layers, which may be the same or different compositions. For example, in one preferred embodiment (not shown), the first layer of coating 130 applied along a surface of a substrate (e.g. 59,63,90,92) comprises TiN and a second outer layer applied over the first layer comprises Ti. Although TiN has desirable electrical conductivity, it has been found to potentially dissolve in fuel cell applications, and thus an overlying layer of titanium prevents the loss of the underlying TiN layer, while reducing electrical resistance.

One preferred aspect of the present invention, is that the coating 130 is relatively thin and while the electrical conductivity and corrosion resistance is high, the amount of metal applied is relatively low and cost effective. By "thin" it is meant that the thickness of the coating 130 is less than 50 microns ($\mu$m). As appreciated by one of skill in the art, the required thickness of the coating 130 is dependent upon on multiple parameters, including, for example, the relative electrical conductivity of the material to be deposited, the interface between the coating and the substrate, and the deposition morphology. In particular, favorable deposition morphology may only require a relatively thin application of the coating 130, because of relatively uniform amorphous surface coverage, which reduces exposure of the underlying substrate and enhances coverage of subsequent layers. Thus, in certain preferred embodiments of the present invention, the thickness of the coating 130 is from between about 0.1 $\mu$m to less than 50 $\mu$m. A particularly preferred thickness in certain embodiments is between about 0.5 $\mu$m to about 5 $\mu$m.

Further, as part of the present invention, it is preferred that the surface of the substrate (e.g. 59,63,90,92) is substantially free of metal oxides, such as aluminum oxide, which are significantly less electrochemically active than the base metal (e.g. metallic aluminum). By "substantially free", it is meant that any metal oxides present are removed to the extent that metal oxides have a negligible effect on contact resistance and adhesion of the subsequent metal coating 130. Thus, metal oxides are removed from the surfaces 90,92 of the metal substrates of sheets 58,60 along the regions where the coating 130 is to be applied, and especially in the regions where electrical contact will occur, such as over the lands 64,84 to minimize electrical resistance. Additionally, certain protective coatings, 130, also have the propensity to oxidize and passivate, thus increasing electrical resistance. As will be discussed further below, certain steps are taken to minimize exposure to such oxidizing environments to prevent electrochemical inactivation It should be understood that an important feature of the present invention is the deposition of the coating 130 on an essentially clean surface e.g. 59,63,90,92. In certain preferred embodiments of the present invention, the pre-cleaning of the substrate to remove oxides, or to activate the surface, is performed in the same chamber as, or simultaneously to, the metal deposition. One preferred method of depositing the coatings 130 onto the substrate surfaces 59,63,90,92 will now be described with reference to FIG. 6. In order to deposit the conductive coating 130 onto the substrate, an ion-assisted, physical vapor deposition (PVD) method is employed.

Figure 6:
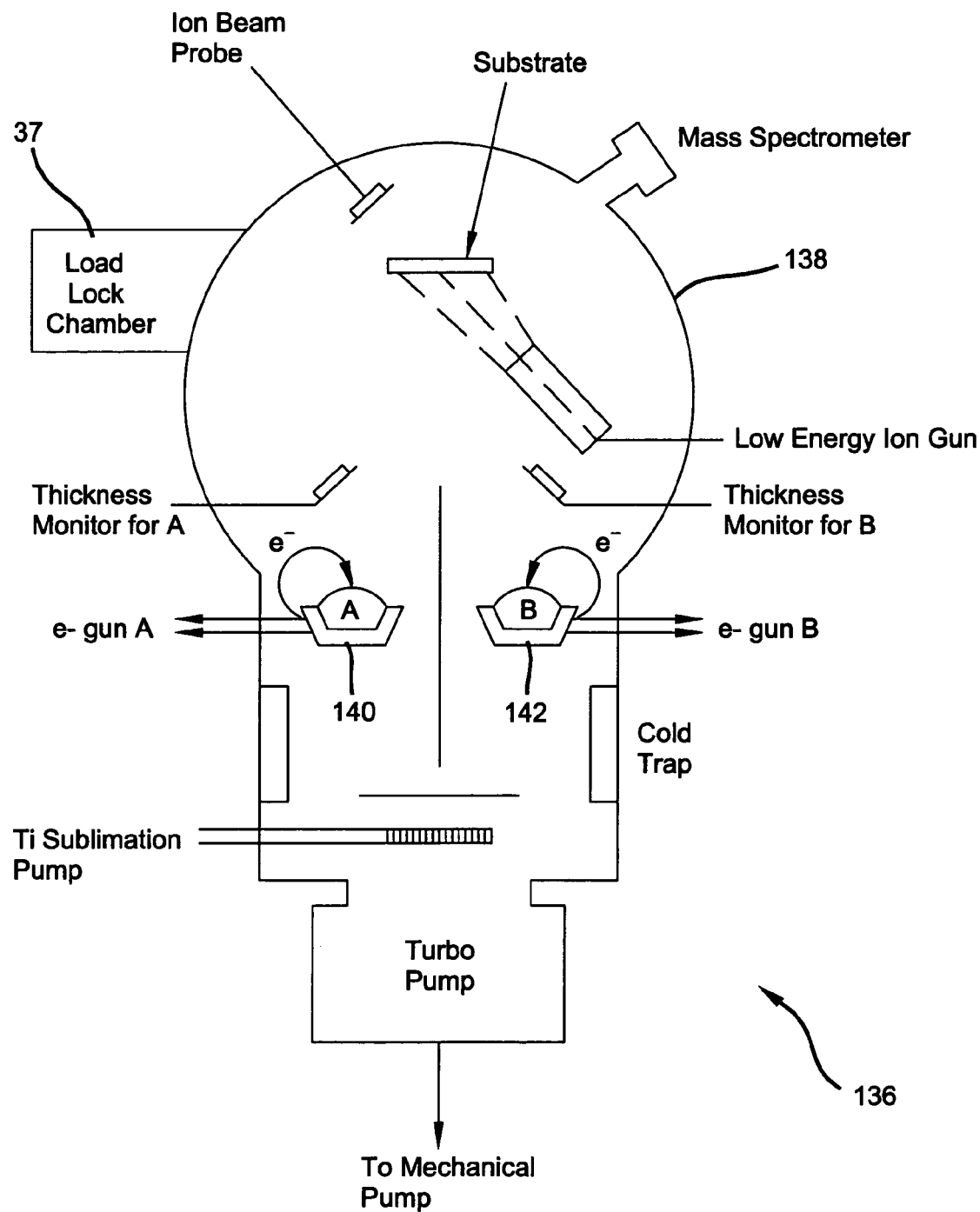
FIG. 6 is a an illustration of a ion-beam evaporation physical vapor deposition apparatus used to coat an electrically conductive element with an electrically conductive metal.

As can be seen in FIG. 6, an ion-assisted PVD apparatus 136 is used. The apparatus 136 includes a deposition chamber 138 and two electron guns A and B for deposition of coating 130. The apparatus 136 also includes a low energy ion gun which is used for sputter cleaning of the substrates, and a turbo pump which allows the apparatus to operated in an ultra-high vacuum. The substrate to be coated with the conductive coating 130 is first placed in a "load-lock" chamber 137 where the pressure is between about $1\times10^{-5}$ to $1\times10^{-6}$ Torr ($1\times10^{-3}$ Pa to $1-10^{-4}$ Pa). The substrate to be coated by the metal coating 130 is then transferred in the deposition chamber 138.

Once the substrate is placed into the deposition chamber 138, the pressure is lowered to about $1\times10^{-9}$ Torr ($1\times10^{-7}$ Pa). A first crucible 140 in the chamber holds the target metal (comprising and element or material comprising an element selected from Groups 4, 5, 10, or 11 of the Periodic Table, here show an as Ti) to be deposited. If a combination of metals or compounds are to be deposited, a second metal is held by a second crucible 142.

The ion gun is used to sputter clean the substrate. As the ion gun sputter cleans the substrate, a beam of electrons is used to melt and evaporate the exemplary target metal (Ti). Such a process may also be known as electron beam evaporation. The target metals are then deposited on the substrate at a rate of 0.10 nm/s to a thickness of equal to or greater than 100 nm, which is observed by thickness monitors.

A unique aspect of the ion-assisted PVD method is that the substrate is sputter cleaned and the conductive coating is deposited essentially simultaneously. By sputter cleaning and coating the substrate simultaneously, the conductive coating 130 may be deposited onto the substrate at ultra-low thicknesses of less than 100 nm.

The present embodiment process is one that is preferred over certain processes that sequentially clean and deposit. When the substrate is exposed to oxygen, the oxide film forms in the time between where the cleaning occurs to where physical vapor deposition deposits the metal onto the substrate. By simultaneously cleaning the substrate and depositing the metal coating 130, the oxide layer is completely and continuously removed thus preventing or at least significantly reducing oxide formation or other fouling of the surface. Simultaneous cleaning of the substrate and depositing of the coating 130 can be accomplished due to the fact that the ion energies required to remove the oxide layer are low. Since the ion energies are low, the bombarding ion fluxes are generally smaller than the depositing atom fluxes that are emitted by the electron guns A and B. This is because oxides being removed are lighter than the metal being deposited onto the substrate as conductive coating 130. As such, the low energy ion gun removes only the oxide layer and not the conductive metal coating 130. The result is that the metal coating 130 is deposited having excellent adhesion to the substrate. Further it is possible to coat only a very thin layer of 0.1 μm or less. Thus, the use of ion-assisted, PVD allows the target metal to be deposited on the substrate very smoothly, evenly, and in a thin layer.

An alternate preferred method of applying the coating 130 is shown in FIG. 7, where a substrate is placed into a PVD magnetron sputtering apparatus 160. A substrate is placed in a vacuum chamber 162 on an anode 164, which is connected to a power supply 166. The vacuum chamber 162 is typically evacuated to pressures of from about $1\times10^{-5}$ to $1\times10^{-7}$ Torr ($1\times10^{-3}$ Pa to $1\times10^{-5}$ Pa). The vacuum chamber 162 is backfilled with argon gas to pressure of 0.1 to 10 Pa. A target metal 168 is housed within a retractable shield 170. A magnetron cathode 172 is situated above the target metal 168. The intensity of the plasma discharge, and the ion flux and sputtering rate depends on the shape of a cathode electrode 172 and on the effective use of a magnetic field to confine the plasma electrons. The target 168 is bombarded with charged argon ions in an argon ion atmosphere while the substrate is charged. The sputtering forms a plasma of metal particles and argon ions that transfer by momentum to coat the substrate. The deposition rate of the target metal 168 onto the substrate depends on the working gas pressure, where high pressure limits the passage of sputtered flux to the substrate.

In preferred methods of applying the metal coating by magnetron sputtering, the substrate is placed into the vacuum chamber 162 and the target metal 168 is sealed by the retractable shield 170 prior to any coating of the metal substrate. The polarity is reversed on the electrodes 164,172 and the argon ions bombard the surface of the substrate at a negative potential of about 2 to 5 kV in an inert atmosphere at about 1 Pa. Thus, by this process, known as "sputter-cleaning" or "plasma-cleaning" the surface is activated and any metal oxides on the surface of the substrate are removed. In the present invention, it is preferred that the sputter cleaning is conducted just before the sputtering deposition process, where the coating 130 is applied. This process has the advantage of minimizing exposure to oxygen, and the likelihood of reforming any metal oxide layers.

Although backfilling with inert atmosphere occurs in the deposition chamber (e.g. 138 or 162), there is still the opportunity for residual oxygen to remain in the deposition chamber. Vacuum pressures which are relatively high enhance the opportunity for residual oxygen to be present in the chamber. Certain metals, such as titanium, generally thermodynamically favor a sub-stoichiometric reaction with oxygen, where it is present at sub-stoichiometric levels. Thus, certain metals favor formation of sub-oxides in the presence of relatively low quantities of residual oxygen. Although not limiting to any theory by which the present invention is bound, it is believed that when the pressures in the chamber are relatively high, slight amounts of oxygen may remain on the surfaces of the target materials supplied to the chamber and this residual oxygen is then available to charge the plasma and to form sub-oxides. Thus, when the coating 130 is applied according to the above described processes, the low quantities of oxygen generally favor the formation of substoichiometric metal oxides for certain elements.

Other methods of applying the coating to the substrate may include chemical vapor deposition, electrolytic deposition, or electroless deposition. In the case of these methods, the layer of metal oxides on the surface of the substrate may be removed by a variety of suitable processes known in the art, which may be conducted prior to the coating process, such as cathodic electrolytic cleaning, mechanical abrasion, cleaning the substrate with alkaline cleaners, and etching with acidic solvents or pickle liquors.

The polymer-based coating 132 is applied over the deposited coating 130. In accordance with the present invention, it is preferred that the polymer-based coating 132 is applied to the substrate within 24 to 48 hours, to minimize oxide formation on the coating 130. It is most preferred that the polymer-based coating 132 is applied less than 4 hours (preferably immediately thereafter) after removing the substrate with the applied coating 130 from the vacuum chamber.

With renewed reference to FIG. 5, the corrosion-resistant polymer-based coating 132 is shown applied to the working surfaces 59, 63 (overlaid with coating 130) of the first and second plates 58, 60. The polymer-based coating 132 is selected for its compatibility with the metal coating 130, its corrosion-resistance, and conductivity. Such a polymer comprises any water-insoluble polymer, which can form a thin adherent film to the metallic layer beneath, and that can withstand the hostile oxidative and acidic environment of the fuel cell. Hence, polymers, such as poly vinyl esters, polyamide-imides, polyimides, polyether-imides, epoxies, silicones, polyphenols, fluoro-elastomers (e.g., polyvinylidene fluoride), polyesters, phenoxy-phenolics, epoxide-phenolics, acrylics, urethanes, inter alia, are seen to be useful with the present invention. Cross-linked polymers are preferred for producing impermeable coatings that provide corrosion-resistant properties.

Preferably, the polymer-based coating 132 is electrically conductive, and has a total contact resistance of less than about 30 m$\Omega$-cm$^2$, and more preferably less than 20 m$\Omega$-cm$^2$ at compression pressures between about 100 psi to 400 psi (about 700 kPa to about 1400 kPa), when in contact with the other materials in the fuel cell (e.g. carbon diffusion media). Depending on the characteristics of the polymer selected, the polymer-based coating 132 may be a polymer matrix comprising a polymeric binder and electrically conductive particles 134. Thus, the polymer-based coating 132 optionally further comprises oxidation-resistant, acid-insoluble, electrically conductive particles 134 (i.e., less than about 50 µm) dispersed throughout an acid-resistant, oxidation-resistant polymer matrix. These conductive particles 134 further reduce the electrical resistivity of the polymer-based coating 132.

The conductive particles 134 are selected from the group consisting of: gold, platinum, graphite, carbon, nickel, conductive metal borides, nitrides and carbides (e.g., titanium nitride, titanium carbide, titanium diboride), titanium alloys containing chromium and/or nickel, palladium, niobium, rhodium, rare earth metals, and other noble metals. Most preferably, the particles 134 will comprise carbon or graphite (i.e., hexagonally crystallized carbon). The particles 134 comprise varying weight percentages of the polymer-based coating 132 depending on both the conductive characteristics of the polymer itself (determining the extent of conductivity needed) and further the density and conductivity of the particles 134 (i.e., particles having a high conductivity and low density can be used in lower weight percentages).

In certain preferred embodiments, the polymer-based coating 132 includes conductive particles 134 comprising graphite, carbon black, and a polymer presented in amounts yielding a desired total carbon content of the coating. In preferred embodiments, the total carbon is less than 75% by weight, and more specifically less than about 40% by weight of the total carbon of the polymer matrix composition (excluding the solvent vehicle weight). One example of a preferred polymer based-coating composition can be found in U.S. patent application Ser. No. 10/292,407 filed on Nov. 11, 2002 to a common assignee as that of the present invention, and is herein incorporated by reference in its entirety. The amount of total carbon in the polymer-based coating 132 is primarily a result of the respective amounts of graphite and carbon black in the coating. In one embodiment, the coating comprises graphite and carbon black at a ratio of about 2:1 by weight. Referring specifically to the amount of graphite in the coating 132, in one embodiment, the coating 132 may comprise between about 3.3% by weight and about 50%, by weight, graphite. Referring specifically to the amount of carbon black in the coating 132, the coating 132 may comprise between about 1.7% by weight and about 20%, by weight, carbon black.

Various types of graphite are particularly preferred for use in the polymer-based coating 132. The graphite may be selected from expanded graphite, graphite powder, graphite flakes. The graphite may be characterized by a particle size between about 5 µm and about 90 µm. The graphite may have a low density, which is generally less than 1.6 g/cm$^3$, and more specifically, less than about 0.3 g/cm$^3$. The density may range between about 0.05 g/cm$^3$ and about 0.2 g/cm$^3$, and more specifically between about 0.1 g/cm$^3$ to about 0.2 g/cm$^3$. The graphite may have a relatively high purity and is substantially free of contaminants. The expanded graphite having any of the above described features for use in a coating 132 according to the present invention may be produced by any suitable method. In one embodiment a suitable graphite material may be used that is available from Signa Great Lakes under the tradename Sigriflex.

Additionally, various types of carbon black are suitable for use in the coating. By way of illustration and not by limitation, the carbon black may be selected from acetylene black, Ketjen™ black, Vulcan black, Regal™, furnace black, black pearl and combinations thereof. Carbon black may be characterized by a particle size between about 0.05 and about 0.2 µm. The carbon black generally contains few impurities.

In addition to the differing amounts of graphite and carbon black, the polymer coating 132 may also include differing amounts of binder polymer. The amount of polymer may vary depending upon the amount of conductive particles 134 used in the coating. Generally, higher binder polymer content is desired for enhanced adhesion, corrosion resistance, and application flow. In one embodiment, the polymer coating 132 comprises between about 1% and 95% by weight of binder polymer in the matrix, and more specifically about 90% by weight of the polymer. Many types of binder polymers are suitable for use in the polymer-based coating 132, as previously discussed. In one embodiment, the binder polymer comprises a polymeric resin. Preferred polymeric resins according to the present embodiment include polyamide imide, polyimide, poly vinyl ester and combinations thereof. Suitable vehicles for the binders include, but are not limited to, propylene glycol methyl ether acetate, N-methyl-2-pryrrlidone, xylene and combinations thereof.

A variety of different coating compositions are contemplated by the present invention. In one embodiment, the polymer coating 132 is in the form of a gel. Specifically, in one preferred embodiment, the coating 132 comprises about 6.7% by weight of expanded graphite, having a particle size from about 5 µm to about 90 µm, about 3.3% by weight of acetylene black, having a particle size of about 0.05 µm to about 0.2 µm, and about 90% by weight of polyamide imide binder polymer.

In the present embodiment, the polymer-based coating 132 exhibits a contact resistance between about 5 to about 60 m$\Omega$-cm$^2$ (milli-Ohm-centimeter square) at a contact pressure of between 25 and about 200 psi (170 to 1400 KPa). Here, the polymer coating 132 exhibits a contact resistance of less than about 10 m$\Omega$-cm$^2$ at a compression pressure greater than or equal to about 200 psi (1400 KPa). In preferred embodiments where graphite and carbon black are used as the conductive particles 134 in the polymer coating 132 matrix, a synergism exists between the expanded graphite and carbon black. The contact resistance remains low, less than 20 mΩ-cm², at low total carbon content. The "synergism" refers to the combination of graphite and carbon black producing a lower contact resistance than when either the graphite or the carbon black are used alone at the same total carbon content. Thus, according to the present embodiment, the polymer coating 132 comprises both graphite and carbon black, however other combinations of conductive particles 134 with polymer in the polymer coating 132 matrix that exhibit a relatively low contact resistance are also suitable for the present invention, as previously discussed above.

The polymer-based coating 132 may be applied to the metal coating on the substrate surfaces 59,63 in a number of ways, e.g., (1) liquid phase or solution coating, (2) electrophoretic deposition, or (3) laminating. In certain preferred embodiments, a method of applying the polymer-based coating 132 is where the coating 132 is applied to the substrate in a liquid phase. Such a liquid phase or solution coating process may include, for example, brushing, spraying, spreading, dipping, coil or roll coating, or applying by pads or hand rollers.

The polymer film 96 is applied to the working face 59, 63 of the substrate 58, 60 by physical application (e.g., spreading with a doctor blade). A precursor of the coating is formed by dissolving the polymer in a suitable solvent, optionally, conductive filler particles 97 can be mixed with the dissolved polymer and applied as a wet slurry atop the substrate 58, 60. The wet coating is then dried (i.e. the solvent removed) and cured as needed (e.g., for thermosets). The conductive particles 97, when present, adhere to the substrate 58, 60 by means of the solvent-free polymer.

A preferred polymer useful with this liquid phase application comprises a polyamide-imide thermosetting polymer. The polyamide-imide is dissolved in a solvent comprising a mixture of N-methylpyrrolidone, propylene glycol and methyl ether acetate. To this solution is, optionally, added about 21% to about 23% by weight of a mixture of graphite and carbon black particles wherein the graphite particles range in size from about 5 μm to about 20 μm and the carbon black particles range in size from about 0.5 μm to about 1.5 μm with the smaller carbon black particles serving to fill the voids between the larger graphite particles and thereby increase the conductivity of the coating compared to all-graphite coatings. The mix is applied to the substrate 58, 60 dried and cured to about 15–30 μm thick coatings 96 (preferably about 17 μm) having a carbon-graphite content of about 38% by weight (if used). It may be cured slowly at low temperatures (i.e., <400° F.), or more quickly in a two step process wherein the solvent is first removed by heating for ten minutes at about 300° F.–350° F. (i.e., dried) followed by higher temperature heating (500° F.–750° F.) for durations ranging from about 30 seconds to about 15 minutes (depending on the temperature used) to cure the polymer.

In another alternate preferred embodiment, the polymer-based coating 132 may be applied by electrophoretic deposition, which can be applied in an automated process with little waste, and can be deposited substantially uniformly onto substrates having complex and recessed surfaces like those used to form the reactant flow fields on the working face(s) of the contact elements. Electrophoretic deposition (e.g. powder coating) is a well-known process useful to coat a variety of conductive substrates such as automobile and truck bodies. Cathodic epoxies, acrylics, urethanes and polyesters are useful by way of example with this method of electrophonetic deposition coating. Subsequent baking of the coated contact element 58,60 cures, crosslinks, and densities the coating.

Yet another alternative method of applying the polymer-based coating is first forming the polymer as a discrete film (e.g. by solvent casting, extrusion, etc.), and then laminating onto the working surface 59, 63 of the contact element 58, 60, e.g., by hot rolling. The discrete film preferably contains a plasticizer to improve handling of the film in this method of application and provides a coating layer atop the substrate 58, 60 that is supple enough so that it can be readily shaped, (e.g., stamped) without tearing or disrupting the film when the contact element 58, 60 is formed as by stamping. Fluoroelastomers such as polyvinylidiene diflouride or the like are useful with this embodiment, and may be used with conventional plasticizers such as dibutyl phthalate.

According to the present invention, it is preferred that the contact resistance of the electrically conductive contact element is less than 50 mOhm-cm² measured with a compressive force of at least 50 psig (350 kPa gauge) pressure applied, and more preferably less than 25 mOhm-cm², and most preferably between about 5 mOhm-cm² to about 20 mOhm-cm², as measured across conductive diffusion paper and through the conductive element.

The present invention provides the ability to coat lightweight corrosion susceptible metals with a corrosion resistant electrically conductive coating that enables use of the corrosion-susceptible metals in a corrosive fuel cell environment, while overcoming problems with prior art coatings. In prior art coatings, defect propagation permitted the growth of corrosion sites on the underlying aluminum, which would rapidly dissolve the underlying metal and decreasing the performance of the fuel stack. Further, thicker protective metal coatings in the past increased electrical resistance and often delaminated or flaked off the substrate, exposing the underlying metal substrate to corrosion. The thin metal coating according to the present invention, also provides a cost-effective method of protecting lightweight metals that will improve fuel cell efficiency and durability.

While the invention has been described in the terms of specific embodiments thereof, it is not intended to be limited thereto but rather only to the extent set forth hereafter in the claims which follow. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for treating an electrically conductive element for use in a fuel cell comprising:
   providing a conductive corrosion-susceptible metal substrate having a surface susceptible to passivation by forming oxides in the presence of oxygen;
   removing said oxides from said surface;
   depositing an electrically conductive coating onto said surface, said coating comprising one or more elements selected from Groups 4, 5, 10, or 11 of the Periodic Table, having a thickness of less than about 50 microns; and
   applying an electrically conductive corrosion-resistant polymer-based coating overlaying said coating comprising said one or more elements on said surface.

2. The method according to claim 1, wherein said metal substrate is selected from the group consisting of: aluminum, magnesium, titanium, alloys and mixtures thereof.

3. The method according to claim 1, wherein said metal substrate comprises aluminum.

4. The method according to claim 1, wherein said removing is conducted in a vacuum.

5. The method according to claim 1, wherein said removing is conducted by plasma cleaning.

6. The method according to claim 1, wherein said one or more elements selected from Groups 4, 5, 10, or 11 is selected from the group consisting of: titanium (Ti), zirconium (Zr), vanadium (V), niobium (Nb), Tantalum (Ta), Gold (Au), Platinum (Pt) and mixtures and alloys thereof.

7. The method according to claim 1, wherein said one or more elements are selected from Groups 4 or 5 of the Periodic Table.

8. The method according to claim 1, wherein said one or more elements of said coating comprises titanium (Ti).

9. The method according to claim 8, wherein said coating comprising one or more elements comprises a compound selected from the group consisting of: titanium nitride (TiN), titanium suboxide ($TiO_x$, where x<2), and mixtures thereof.

10. The method according to claim 1, wherein said coating comprising one or more elements comprises one or more layers.

11. The method according to claim 1, wherein said coating comprising one or more elements has a thickness of between about 0.1 microns to about 50 microns.

12. The method according to claim 1, wherein said coating comprising one or more elements has a thickness of between about 0.5 microns to about 5 microns.

13. The method according to claim 1, wherein said applying of said polymer-based coating is conducted by a process selected from the group consisting of: coating, brushing, spraying, spreading, dipping, rolling, laminating, and powder coating.

14. A method according to claim 1, wherein before said applying, a matrix is formed comprising a polymer and conductive particles, and said matrix is applied to form said polymer-based coating.

15. A method according to claim 1, wherein said depositing of said coating comprising one or more elements is conducted by ion-assisted physical vapor deposition.

16. A method for treating an electrically conductive element for use in a fuel cell comprising:
  providing a conductive corrosion-susceptible metal substrate having a surface susceptible to passivation by forming oxides in the presence of oxygen;
  treating said substrate to remove said oxides from said surface;
  depositing an electrically conductive corrosion-resistant titanium-based coating comprising titanium (Ti) onto said surface; and
  applying an electrically conductive corrosion-resistant polymer-based coating overlaying said titanium-based coating on said surface.

17. The method according to claim 16, wherein said titanium-based coating comprises suboxides of titanium.

18. The method according to claim 16, wherein said metal substrate is selected from the group consisting of: aluminum, magnesium, titanium, alloys and mixtures thereof.

19. The method according to claim 16, wherein said metal substrate comprises aluminum.

20. The method according to claim 16, wherein said treating is conducted in a vacuum.

21. The method according to claim 16, wherein said treating is conducted by plasma cleaning.

22. The method according to claim 16, wherein said titanium-based coating applied by said depositing comprises one or more layers.

23. The method according to claim 16, wherein said titanium-based coating has a thickness of between about 0.1 microns to about 50 microns.

24. The method according to claim 16, wherein said titanium-based coating has a thickness of between about 0.5 microns to about 5 microns.

25. The method according to claim 16, wherein said applying of said polymer-based coating is conducted by a process selected from the group consisting of: coating, brushing, spraying, spreading, dipping, rolling, laminating, and powder coating.

26. A method according to claim 16, wherein before said applying, a matrix is formed comprising a polymer and conductive particles, and said matrix is applied to form said polymer-based coating.

27. A method according to claim 16, wherein said depositing of said coating comprising titanium is conducted by ion-assisted physical vapor deposition.

28. An electrically conductive element for use in a fuel cell comprising:
  an electrically conductive corrosion-susceptible metal substrate having a surface susceptible to passivation by forming oxides in the presence of oxygen; wherein said surface is substantially free of said oxides and overlaid with an electrically conductive corrosion-resistant coating comprising one or more elements selected from Groups 4, 5, 10, or 11 of the Periodic Table and having a thickness of less than 50 microns; and
  a corrosion-resistant electrically conductive polymer-based coating applied over said conductive corrosion-resistant coating on said surface.

29. The electrically conductive element according to claim 28, wherein said metal substrate is selected from the group consisting of: aluminum, magnesium, titanium, alloys and mixtures thereof.

30. The electrically conductive element according to claim 28, wherein said metal substrate comprises aluminum.

31. The electrically conductive element according to claim 28, wherein said corrosion-resistant coating comprising one or more elements comprises one or more layers.

32. The electrically conductive element according to claim 28, wherein said one or more elements of said coating selected from Groups 4, 5, 10, or 11 is selected from the group consisting of: titanium (Ti), zirconium (Zr), vanadium (V), niobium (Nb), Tantalum (Ta), Gold (Au), Platinum (Pt) and mixtures and alloys thereof.

33. The electrically conductive element according to claim 28, wherein said one or more elements of said coating are selected from Groups 4 or 5 of the Periodic Table.

34. The electrically conductive element according to claim 33, wherein said one or more elements of said coating comprises titanium (Ti).

35. The electrically conductive element according to claim 34, wherein said coating comprising one or more elements comprises a compound selected from the group consisting of: titanium nitride (TiN), titanium suboxide ($TiO_x$, where x<2), and mixtures thereof.

36. The electrically conductive element according to claim 28, wherein said corrosion-resistant coating comprising one or more elements has a thickness of between about 0.1 microns to about 50 microns.

37. The electrically conductive element according to claim 28, wherein said corrosion-resistant coating comprising one or more elements has a thickness of between about 0.5 microns to about 5 microns.

38. The electrically conductive element according to claim 28, wherein said substrate having said corrosion-resistant coating comprising one or more elements and said polymer-based coating has a contact resistance of less than 50 mOhm-cm$^2$ under a compressive force of 50 psi (350 kPa) or greater.

39. The electrically conductive element according to claim 38, wherein said substrate having said corrosion-resistant coating comprising one or more elements and said polymer-based coating has a contact resistance of less than 25 mOhm-cm$^2$ under a compressive force of 50 psi (350 kPa) or greater.

40. The electrically conductive element according to claim 28, wherein said polymer-based coating comprises a matrix of a polymeric binder and a plurality of electrically conductive particles.

41. The electrically conductive element according to claim 40, wherein said electrically conductive particles of said polymer-based coating are selected from the group consisting of: gold, platinum, nickel, tin, silver, palladium, noble metals, graphite, carbon black, and mixtures thereof.

42. The electrically conductive element according to claim 40, wherein said electrically conductive particles comprise graphite and carbon black.

43. The electrically conductive element according to claim 42, wherein said graphite is selected from the group consisting of: expanded graphite, graphite powder, graphite flakes, and mixtures thereof.

44. The electrically conductive element according to claim 42, wherein said total amount of graphite and carbon combined are present in said matrix at less than about 40% by weight.

45. The electrically conductive element according to claim 40, wherein said polymeric binder is selected from the group consisting of: poly vinyl esters, polyamide-imides, polyimides, polyether-imides, epoxies, silicones, polyphenols, fluoro-elastomers, polyesters, phenoxy-phenolics, epoxide-phenolics, acrylics, urethanes, and mixtures thereof.

* * * * *